J. MESSIKOMMER.
SAFETY APPLIANCE FOR FLYING MACHINES.
APPLICATION FILED MAR. 16, 1914.
1,143,643.
Patented June 22, 1915.
3 SHEETS—SHEET 2.
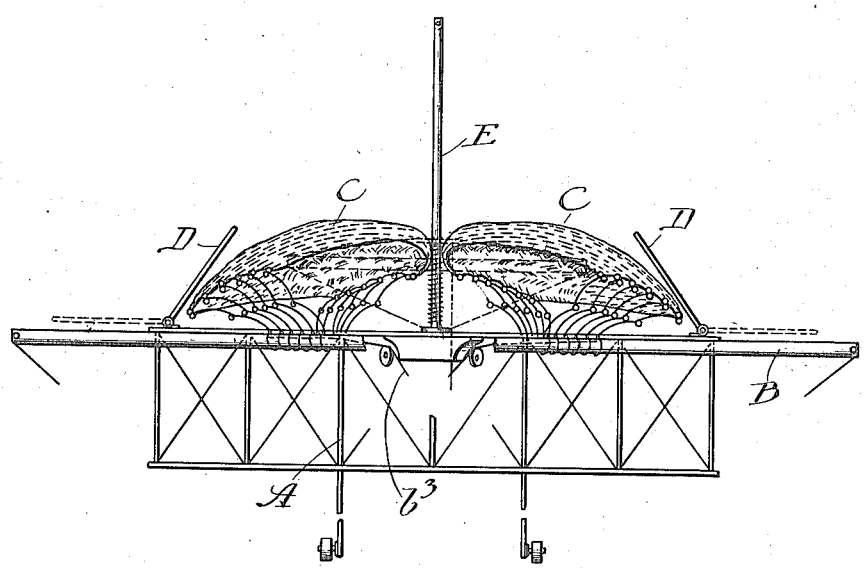
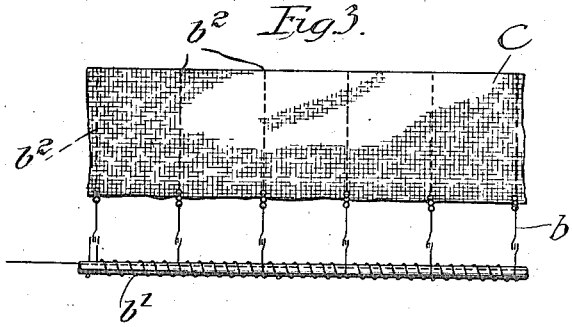
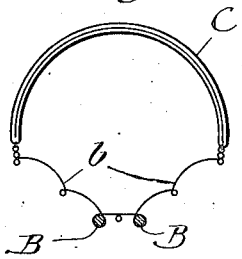
Witnesses:
Inventor:
Jacob Messikommer
by Arthur K. Arnaud
Atty.

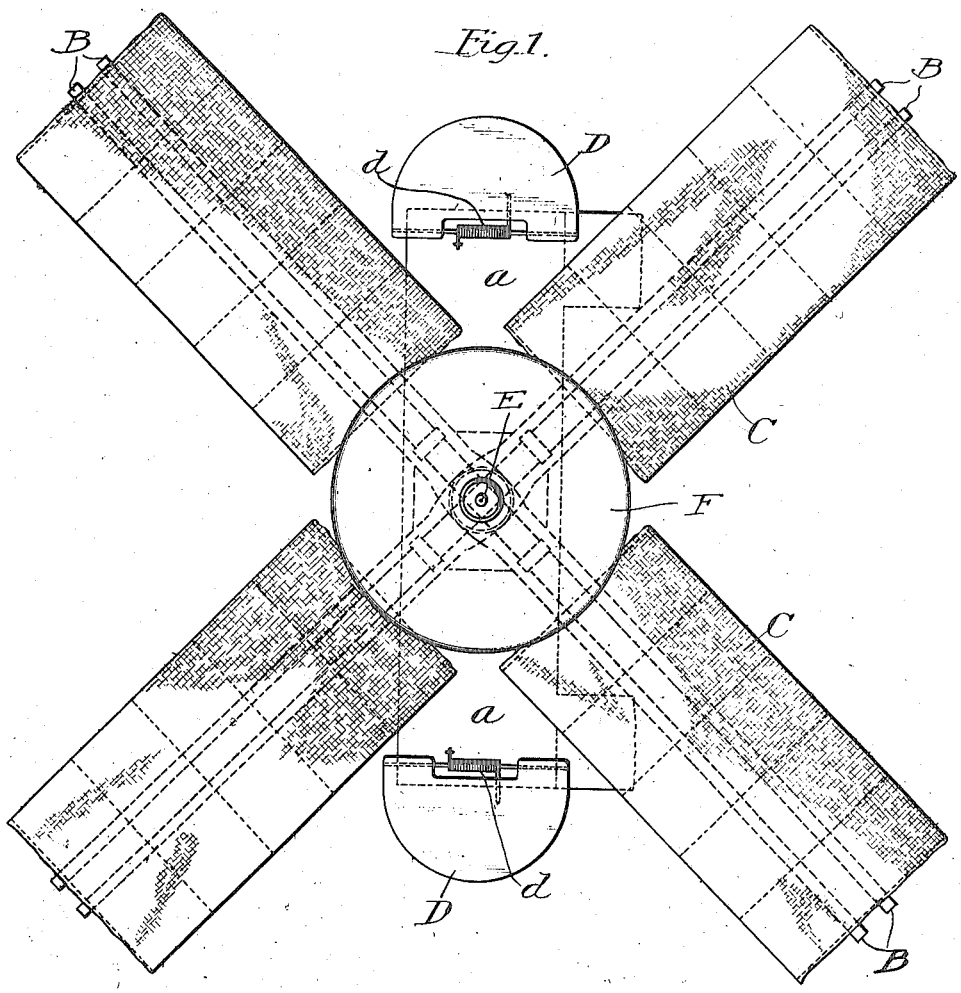

J. MESSIKOMMER.
SAFETY APPLIANCE FOR FLYING MACHINES.
APPLICATION FILED MAR. 16, 1914.

1,143,643.
Patented June 22, 1915.
3 SHEETS—SHEET 3.

UNITED STATES PATENT OFFICE.

JACOB MESSIKOMMER, OF CHICAGO, ILLINOIS.

SAFETY APPLIANCE FOR FLYING-MACHINES.

1,143,643.  Specification of Letters Patent.  Patented June 22, 1915.

Application filed March 16, 1914. Serial No. 824,981.

*To all whom it may concern:*

Be it known that I, JACOB MESSIKOMMER, a citizen of the United States of America, and resident of Chicago, Cook county, Illinois, have invented a certain new and useful Improvement in Safety Appliances for Flying-Machines, of which the following is a specification.

My invention relates to safety appliances for flying machines, such as aeroplanes and the like, and more especially to devices of this kind which involve the use of one or more parachutes for preventing accidents.

Generally stated, the object of my invention is to provide a novel and effective arrangement of parachutes for preventing the aeroplanes or other similar heavier-than-air flying machine from falling should the machine capsize or the power give out, and whereby the machine is, in fact, prevented from capsizing under circumstances which would ordinarily result in an accident of this kind, the object being to apply the parachutes in such manner that the machine will, if the apparatus is operated in time, be prevented from capsizing, and in a way which would serve automatically to bring the machine back to normal position should it turn over or start to fall.

It is also an object to provide certain details and features of construction and combinations tending to increase the general efficiency and reliability of a flying machine safety appliance of this particular character.

To the foregoing and other useful ends my invention consists in matters hereinafter set forth and claimed.

Figure 5:
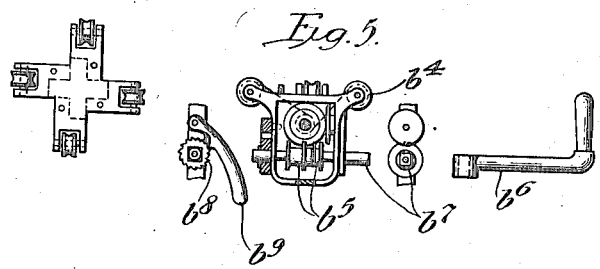
Figure 6:
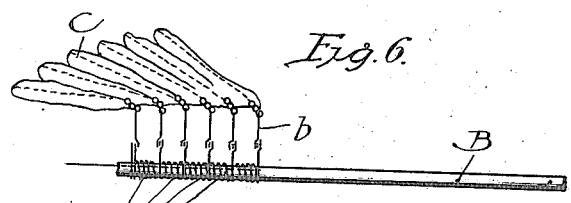
Figure 7:
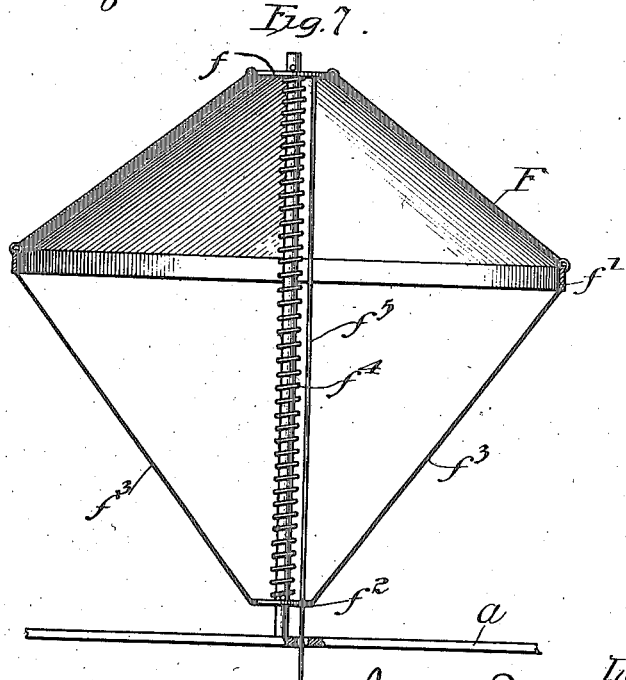

In the accompanying drawings—Figure 1 is a top view or plan of an aeroplane equipped with a safety appliance or system of automatic parachutes embodying the principles of my invention. Fig. 2 is a front elevation of the said flying machine and safety appliance, showing the parachutes folded into inoperative position. Fig. 3 is a side elevation of one of the horizontally folded parachutes. Fig. 4 is an end elevation of the parachute shown in Fig. 3. Fig. 5 is a group of detail parts. Fig. 6 is a view similar to Fig. 3, but showing the parachute in folded position. Fig. 7 is an enlarged vertical section of the central or middle parachute, showing the same in extended or operated position.

As thus illustrated, the aeroplane A may be of any suitable known or approved construction. The horizontal rods B are arranged in pairs, in the manner shown in Fig. 1, in a horizontal plane at the top of the flying machine. The four pairs of rods thus provided form a cross, the arms of which are oblique to the top of the aeroplane. Parachute sections C, of cloth or other suitable material, are secured by springy wires $b$ to coil springs $b^1$ that encircle the said rods, whereby each parachute section is slidable on its allotted pair of rods. Each section is provided with ribs $b^2$ which hold the cloth in extended or curved position, but permit it to fold toward the machine in the manner shown in Figs. 2 and 6. The springs $b^1$ tend to extend or spread the parachute sections to catch the air in the manner shown in Figs. 1 and 3. Cords or other flexible connections $b^3$, which run over sheaves $b^4$ at the center of the machine, and which are secured to the outer ends of the springs $b^1$, are employed for folding these parachute sections in the manner shown in Fig. 2, and for retaining them in this position. The four cords are wound on drums $b^5$, of any suitable character, operated by a crank $b^6$ applied to the shaft $b^7$ of the drums. A ratchet device $b^8$ can be mounted on said shaft, or applied in any other portion of the winding drum mechanism, whereby the parachute sections are held in retracted position. By raising the handle $b^9$ the said ratchet is released and the springs $b^1$ then quickly spread the parachute sections B in the manner shown in Fig. 1, whereby the machine is prevented from capsizing or falling.

The wings D are pivoted to the outer ends of the upper plane $a$ of the machine, whereby they are movable about horizontal and parallel axes, springs $d$ being applied for holding said wings in extended or horizontal position. By means of cords or other flexible connections, not shown, the said wings can be held in the position shown in Fig. 2, whereby they overlie the parachutes C to some extent, holding the same in place when folded. When the said wings are released they also, and by reason of their yielding resistance to the air, have a stabilizing effect which serves to assist in preventing capsizing of the machine.

The top of the machine is also provided centrally thereof with a post or riser E upon which is mounted a parachute F of substantially umbrella shape. This parachute has an upper ring $f$ that slides up and down on the said riser and a lower ring $f^1$ which holds the parachute in spread out or extended condition. A fixed member $f^2$ on the riser is connected by cords $f^3$ with the ring $f^1$, whereby the parachute is held in the position shown in Fig. 7 when in use. A spring $f^4$ which encircles the riser serves to automatically raise the parachute F on the riser. The cord or other flexible connection $f^5$, attached to the top of the parachute F, serves as a means for pulling the parachute downward, this cord being also suitably connected in any desired manner with the winding drum mechanism shown in Fig. 5, whereby all five parachutes may be folded at the same time. Also, and with this arrangement, the five parachutes are released and spread to catch the air when the handle $b^9$ is raised.

Should the machine start to fall the central parachutes, or parachute sections, if promptly released, will minimize the danger and retard the fall in a manner that will be readily understood. Also, and should the machine capsize, the spreading parachutes will then have a tendency to right the machine. In this way the said parachutes constitute a provision for preventing accidents, and for minimizing some of the dangers which are well known to aviation. The parachutes are not only released very readily and quickly, but are also then automatically spread to catch the air.

With the foregoing construction, it will be seen that the parachutes C are so mounted and constructed that they are quite loose and adapted to bag upward and thus catch the air and break the fall when the aeroplane falls. These parachutes are not in the nature of planes, but to the contrary are loosely mounted and expanded by the air exactly in the same manner that an ordinary parachute operates when dropped with a weight at its lower end.

What I claim as my invention is:—

1. An aeroplane provided with outwardly extending rods at the top thereof, parachute sections disposed loosely over said rods, slidably connected thereto, whereby each section folds inward toward the vertical axis of the machine, and means for operating the sections on the rods to spread the same to catch the air, each section constructed to bag upward, said rods being arranged in pairs, and each parachute section having its opposite edges connected respectively with the members of a pair, which members are disposed a distance apart less than the width of the section allotted thereto.

2. An aeroplane provided with outwardly extending rods at the top thereof, parachute sections disposed loosely over said rods, slidably connected thereto, whereby each section folds inward toward the vertical axis of the machine, and means for operating the sections on the rods to spread the same to catch the air, each section constructed to bag upward, said means including springs for extending the sections on the rods, said rods being arranged in pairs, and each parachute section having its opposite edges connected respectively with the members of a pair, which members are disposed a distance apart less than the width of the section allotted thereto.

3. An aeroplane provided with outwardly extending rods at the top thereof, parachute sections disposed over said rods, slidably connected thereto, whereby each section folds inward to a position above and near the center of the machine, and means for operating the sections on the rods to spread the same to catch the air, said rods extending obliquely and horizontally at the top of the aeroplane.

4. An aeroplane provided with outwardly extending rods at the top thereof, parachute sections disposed over said rods, slidably connected thereto, whereby each section folds inward to a position above and near the center of the machine, and means for operating the sections on the rods to spread the same to catch the air, said means including springs for extending the sections on the rods, and connections for pulling the outer ends of the sections toward the center of the aeroplane, said rods being arranged in pairs, and each parachute section having its opposite edges connected respectively with the members of a pair, which members are disposed a distance apart less than the width of the section allotted thereto.

5. An aeroplane provided with outwardly extending rods at the top thereof, parachute sections disposed loosely over said rods, slidably connected thereto, whereby each section folds inward to a position above and near the center of the machine, and means for operating the sections on the rods to spread the same to catch the air, each section having ribs for holding it distended upward in position to form a baggy parachute.

6. An aeroplane provided with outwardly extending rods at the top thereof, parachute sections disposed over said rods, slidably connected thereto, whereby each section folds inward, and means for operating the sections on the rods to spread the same to catch the air, wings which fold over the sections, disposed at the outer ends of the aeroplane, springs for holding said wings in unfolded position, and means for holding the wings in folded position.

7. An aeroplane provided with outwardly extending rods at the top thereof, parachute sections disposed over said rods, slidably connected thereto, whereby each section folds inward, and means for operating the sections on the rods to spread the same to catch the air, a riser on said aeroplane, and a parachute slidable up and down on said riser.

8. An aeroplane provided with outwardly extending rods at the top thereof, parachute sections disposed over said rods, slidably connected thereto, whereby each section folds inward, and means for operating the sections on the rods to spread the same to catch the air, a riser on said aeroplane, and a parachute slidable up and down on said riser, said riser having a spring for raising the parachute thereon, and means for pulling the parachute down on the riser.

9. An aeroplane provided with a riser at the top thereof, a parachute on said riser, movable up and down thereon, means for operating said parachute, said means including a spring which is expansible upward for raising the parachute, a connection to the top of said spring for pulling the parachute down, and other parachutes extending outward from the base of said riser, said first mentioned parachute covering the area between the inner ends of said last mentioned parachutes.

10. An aeroplane comprising wings for the ends of the plane, extending across the ends of the latter, springs for yieldingly holding said wings in extended position, and folding parachutes, said wings in folded position extending upward and over the folded parachutes.

Signed by me at Chicago, Illinois, this 7th day of March, 1914.

JACOB MESSIKOMMER.

Witnesses:
ARTHUR F. DURAND.
RACHEL J. RICHARDSON.